United States Patent
Lee et al.

(10) Patent No.: US 11,824,462 B2
(45) Date of Patent: Nov. 21, 2023

(54) SUB-MODULE OF POWER CONVERTER INCLUDING BYPASS SWITCH

(71) Applicant: HYOSUNG HEAVY INDUSTRIES CORPORATION, Seoul (KR)

(72) Inventors: Doo Young Lee, Uiwang-si (KR); Yong Hee Park, Anyang-si (KR); Hong Ju Jung, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 29 days.

(21) Appl. No.: 17/623,395

(22) PCT Filed: Aug. 21, 2020

(86) PCT No.: PCT/KR2020/011208
§ 371 (c)(1),
(2) Date: Dec. 28, 2021

(87) PCT Pub. No.: WO2021/034153
PCT Pub. Date: Feb. 25, 2021

(65) Prior Publication Data
US 2022/0376611 A1 Nov. 24, 2022

(30) Foreign Application Priority Data
Aug. 21, 2019 (KR) ........................ 10-2019-0102703

(51) Int. Cl.
*H02M 7/483* (2007.01)
*H02M 1/32* (2007.01)

(52) U.S. Cl.
CPC .......... *H02M 7/4835* (2021.05); *H02M 1/325* (2021.05)

(58) Field of Classification Search
CPC ..... H02M 7/4835; H02M 1/322; H02M 1/325
See application file for complete search history.

(56) References Cited

U.S. PATENT DOCUMENTS

| 2016/0197547 | A1 | 7/2016 | Park et al. |
| 2019/0131885 | A1 | 5/2019 | Dorn et al. |
| 2022/0085731 | A1* | 3/2022 | Mohanaveeramani ............ H02M 7/155 |

FOREIGN PATENT DOCUMENTS

| CN | 103078400 A | 5/2013 |
| EP | 3163729 A1 | 5/2017 |
| JP | 2015-130743 A | 7/2015 |
| KR | 10-1197066 B1 | 11/2012 |

(Continued)

*Primary Examiner* — Jue Zhang
(74) *Attorney, Agent, or Firm* — NKL Law; Jae Youn Kim (57) ABSTRACT

Proposed is a sub-module of a power converter, the sub-module capable of allowing failure-causing electric current to quickly bypass the sub-module when a failure occurs in the sub-module. A sub-module of a power converter according to an embodiment of the present disclosure, the sub-module including an energy storage unit, at least one power semiconductor circuit connected, in parallel, to the energy storage unit and configured with a plurality of power semiconductor switches and a plurality of freewheeling diodes, and a switching element arranged between two output terminals connected to one of one or more of the power semiconductor circuits, forced to undergo an induced failure when an induced-failure signal is input into a gate terminal thereof, and internally short-circuited, thereby connecting the output terminals to each other.

9 Claims, 5 Drawing Sheets

(56) References Cited

FOREIGN PATENT DOCUMENTS

KR       10-1389579 B1    4/2014
WO     2016-002319 A1    1/2016

\* cited by examiner

SUB-MODULE OF POWER CONVERTER INCLUDING BYPASS SWITCH

TECHNICAL FIELD

The present disclosure relates to a sub-module of a power converter and, more particularly, to a sub-module of a power converter, the sub-module capable of allowing failure-causing electric current to bypass the sub-module when a failure occurs in the sub-module.

BACKGROUND ART

Usually, in a high-voltage converter, a power semiconductor that is controllable in such a manner as to be turned on and turned off is used for conversion between an alternating current voltage and a direct current voltage.

Resistance of the power semiconductor to a voltage is limited. Therefore, a plurality of semiconductor modules, each having a power semiconductor circuit, need to be connected in series to each other in order to deal with a high voltage. For configuration of the power semiconductor circuit, various semiconductor modules can be connected to each other.

As is generally known, a publicly known modular multilevel converter includes a plurality of sub-modules in each of which the above-described power semiconductor circuit forms two output terminals. The plurality of sub-modules are connected in series to each other. The sub-module, for example, may be configured to include an energy storage unit and a power semiconductor circuit connected, in parallel, to the energy storage unit and configured with a plurality of power semiconductor switches and a plurality of freewheeling diodes.

When a failure occurs in a specific sub-module among the plurality of sub-modules, the specific sub-module in which the failure occurs is short-circuited in order to stably operate a system. For this short circuit, a bypass switch allows failure-causing electric current to bypass the sub-module in which the failure occurs. Thus, with other sub-modules that operate normally, the system can continue operating normally.

Technologies that allow electric current to bypass in a short time a sub-module in which a failure occurs when the failure occurs in the sub-module are very important from the point of view of the system, as well as the sub-module. When it takes a long time for the bypass switch to perform switching, an excessive voltage may be applied to the sub-module in which a failure occurs, and excessive electric current may flow thereto. Thus, internal components (a capacitor and a power semiconductor) may explode, thereby causing a fire. Furthermore, the excessive voltage may be applied to an entire system or the excessive electric current may flow thereto. Also, an excessive voltage higher than a rated voltage may be applied to each of the sub-module, and the excessive electric current higher than rated electric current may flow thereto. The excessive voltage and the excessive electric current may have an adverse effect on the reliability of the entire system.

Technologies that use a mechanical switch have been proposed to ensure the reliability of a bypass operation performed by the bypass switch. Korean Patent No. 10-1197066 discloses the technology that enables the mechanical switch to function as the bypass switch in a power converter.

However, the use of the mechanical switch as the mechanical switch poses a problem in that it takes a long time for the bypass switch to perform switching. Therefore, in the art to which the present disclosure pertains, there is a demand for bypass switches that can operate in a stable and fast manner.

DISCLOSURE

Technical Problem

An objective of the present disclosure, which is made to solve the above-described problem, is to provide a sub-module of a power converter, the sub-module capable of allowing failure-causing electric current to quickly bypass the sub-module when a failure occurs therein.

Another objective of the present disclosure is to provide a sub-module of a power converter, the sub-module in which, with a specific signal, a specific voltage, or specific electric current, a bypass switch is forced to undergo an induced failure and thus is internally short-circuited, thereby connecting two output terminals to each other. Thus, in the sub-module of the power converter, the specific electric current is allowed to quickly bypass the sub-module.

Technical Solution

According to an aspect of the present disclosure, there is provided an energy storage unit; at least one power semiconductor circuit connected, in parallel, to the energy storage unit and configured with a plurality of power semiconductor switches and a plurality of freewheeling diodes; and a switching element arranged between two output terminals connected to one of one or more of the power semiconductor circuits, forced to undergo an induced failure when an induced-failure signal is input into a gate terminal thereof, and internally short-circuited, thereby connecting the output terminals to each other.

In the sub-module, when a failure occurs in the sub-module, failure-causing electric current may bypass the sub-module through the output terminals and the switching element.

In the sub-module, the switching element may include a press pack IGBT (PPI) semiconductor element.

According to another aspect of the present disclosure, there is provided a sub-module of a power converter, the sub-module including: an energy storage unit; at least one power semiconductor circuit connected, in parallel, to the energy storage unit and configured with a plurality of power semiconductor switches and a plurality of freewheeling diodes; a switching element between two output terminals connected to one of one or more of the power semiconductor circuits; and a high electric-current generator applying electric current to the switching element when a failure occurs, wherein the switching element is turned on when the failure occurs, and is forced to undergo an induced failure and thus is internally short-circuited when electric current higher than rated electric current flows from the high electric-current generator thereto, thereby connecting the output terminals to each other.

In the sub-module, the high electric-current generator may apply electric current higher than rated electric current for the switching element to the switching element, and when the electric current higher than the rated electric current is applied, the switching element may be forced to undergo the induced failure.

In the sub-module, when the failure occurs in the sub-module, failure-causing electric current may bypass the sub-module through the output terminals and the switching element.

In the sub-module, the switching element may include a press pack IGBT (PPI) semiconductor element.

According to still another aspect of the present disclosure, there is provided a sub-module of a power converter, the sub-module including: an energy storage unit; at least one power semiconductor circuit connected, in parallel, to the energy storage unit and configured with a plurality of power semiconductor switches and a plurality of freewheeling diodes; a switching element arranged between two output terminals connected to one of one or more of the power semiconductor circuits; and a DC-DC converter applying a voltage to the switching element, wherein the switching element is turned on when a failure occurs, and is forced to undergo an induced failure and thus is internally short-circuited when a voltage higher than a rated voltage is applied from the DC-DC converter, thereby connecting the output terminals to each other.

In the sub-module, the high electric-current generator may apply a voltage higher than a rated voltage for the switching element to the switching element, and when the voltage higher than the rated voltage is applied, the switching element is forced to undergo the induced failure.

In the sub-module, when the failure occurs in the sub-module, failure-causing electric current may bypass the sub-module through the output terminals and the switching element.

In the sub-module, the switching element may include a press pack IGBT (PPI) semiconductor element.

According to still another aspect of the present disclosure, there is provided a sub-module of a power converter, the sub-module including: an energy storage unit; at least one power semiconductor circuit connected, in parallel, to the energy storage unit and configured with a plurality of power semiconductor switches and a plurality of freewheeling diodes; and a bypass switching unit arranged between two output terminals connected to one of one or more of the power semiconductor circuits, wherein the bypass switching unit includes a switching element connected to one of the power semiconductor circuits; a capacitor connected, in parallel, to the switching element, a voltage higher than a rated voltage for the switching element being applied to the capacitor; and a switch connected between the switching element and the capacitor and turned on and turned off with a predetermined control signal, and wherein the switching element and the switch are turned on when a failure occurs, and when the switch is turned on, due to a voltage applied to the capacitor, the switching element is forced to undergo an induced failure and thus is internally short-circuited, thereby connecting the output terminals to each other.

In the sub-module, the switching element may include a press pack IGBT (PPI) semiconductor element.

In the sub-module, when the failure occurs in the sub-module, failure-causing electric current may bypass the sub-module through the output terminals and the switching element.

Advantageous Effects

According to the present disclosure, a sub-module of a power converter can achieve the following effects.

According to the present disclosure, a bypass switch is quickly short-circuited when a failure occurs in the sub-module of the power converter. Thus, the effect of shortening a bypass time can be achieved.

According to the present disclosure, the bypass switch is mounted between output terminals of the sub-module of the power converter. With a specific signal, specific electric current, or a specific voltage, the bypass switch is forced to undergo an induced failure. Due to the induced failure, there occurs a short circuit between the output terminals. Thus, the effect of allowing failure-causing current to quickly bypass the sub-module can be achieved.

MODE FOR INVENTION

Embodiments of the present disclosure will be described in detail below with reference to the illustrative drawings. It should be noted that the same constituent elements, although illustrated in different drawings, are given the same reference character, if possible, throughout the drawings. In addition, detailed specific descriptions of well-known configurations or functions related to the embodiments described below of the present disclosure will be omitted when determined as not contributing to an understanding of the embodiments of the present disclosure.

In addition, the terms first, second, and so on, A, B, and so on, and (a), (b), and so on may be used in describing constituent elements according to the embodiments of the present disclosure. These terms are used only to distinguish among the same constituent elements, and do not impose any limitation on the natures, the order, and the like of the same constituent elements. One constituent element, when described as being "coupled" to, "combined" with, or "connected" to, a different constituent element, may be directly coupled to, combined with, or connected to the different constituent, but it should also be understood that these two constituent elements may be coupled to, combined with, or connected to each other with a third constituent element in between.

Figure 1:
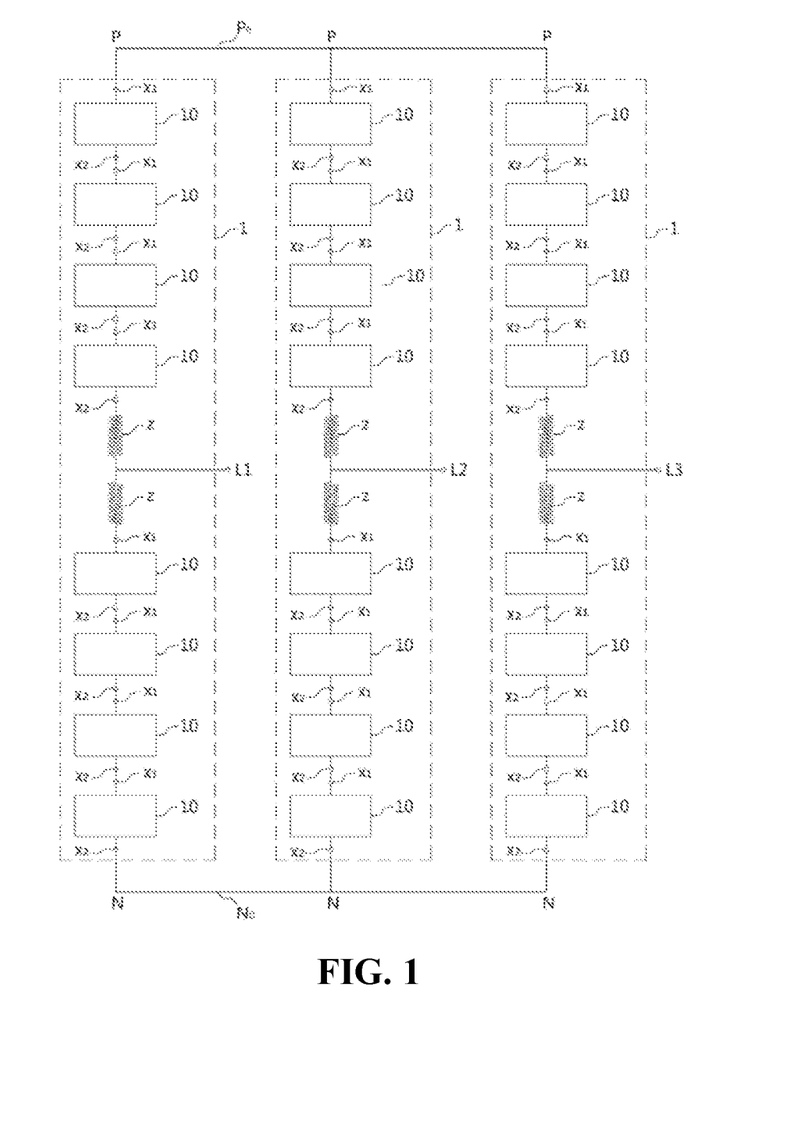
FIG. 1 is an equivalent circuit diagram illustrating a power converter according to an embodiment of the present disclosure.

FIG. 1 is an equivalent circuit diagram illustrating a power converter according to an embodiment of the present disclosure.

With reference to FIG. 1, the power converter according to the present disclosure is configured with one or more phase modules 1. A plurality of sub-modules 10 are connected in series to each other in each of the phase modules 1. In addition, direct-current voltage sides of each of the phase modules 1 are connected to positive and negative direct-current voltage main lines $P_0$ and $N_0$, respectively.

A direct current voltage, which is not indicated by its symbol, is applied between positive and negative direct-current voltage main lines $P_0$ and $N_0$. Each of the phase modules 1 has one intermediate direct-current voltage terminal and two outside direct-current voltage terminals, as load connection terminals.

The plurality of phase modules 10 are connected in series to each other in the phase module 1. Two output terminals, that is, a first output terminal X1 and a second output terminal X2 are formed on each of the sub-modules 10 that are connected in series to each other in each of the phase modules 1. Electric current flows through the first and second output terminals X1 and X2.

The power converter configured as described above may constitute facilities for transmitting high voltage electric current and serves to connect AC voltage power systems to each other for transmission of high electric power therebetween.

In addition, the power converter may be part of so-called FACTS facilities that serve to ensure system stabilization and desired voltage quality. Furthermore, a converter illustrated in FIG. 1 may be used when a driving technology is employed.

In the power converter according to the present disclosure, when a failure occurs in the sub-module 10, electric current that is to be input into the sub-module 10 in which the failure occurs is allowed to bypass the sub-module 10 in order to prevent an open circuit in the phase module 1 and thus protects the sub-module 10. Furthermore, the electric current bypassing the sub-module 10 flows to another sub-module 10 that operates normally, and thus normal operation of the sub-modules 10 makes it possible for the converter to operate normally.

To this end, the sub-module 10 includes a switching element or a bypass switching unit, for allowing electric current to bypass the sub-module 10. With a specific signal, a specific voltage, or specific electric current, the switching element or the bypass switching unit is forced to undergo an induced failure. When the induced failure occurs, the switching element is internally short-circuited within a short time, thereby allowing electric current to bypass the sub-module 10.

At this point, the switching element or the bypass switching unit that is internally short-circuited due to the induced failure is no longer restored to its normal state. Therefore, unlike a semiconductor switch in the related art, the switching element or the bypass switching unit according to the present disclosure is internally short-circuited due to the induced failure. Accordingly, after internally short-circuited, the switching element or the bypass switching unit is impossible to turn on and turn off and is kept short-circuited.

According to the present embodiment, the switching element or the bypass switching element is short-circuited within several msec. Accordingly, during normal operation, normal electric current flows through the sub-modules 10, but when a failure occurs in a specific sub-module 10, through the switching element or the bypass switching unit, electric current bypasses the specific sub-module 10 in which the failure occurs. Thus, the specific sub-module 10 in which the failure occurs is protected.

Figure 2:
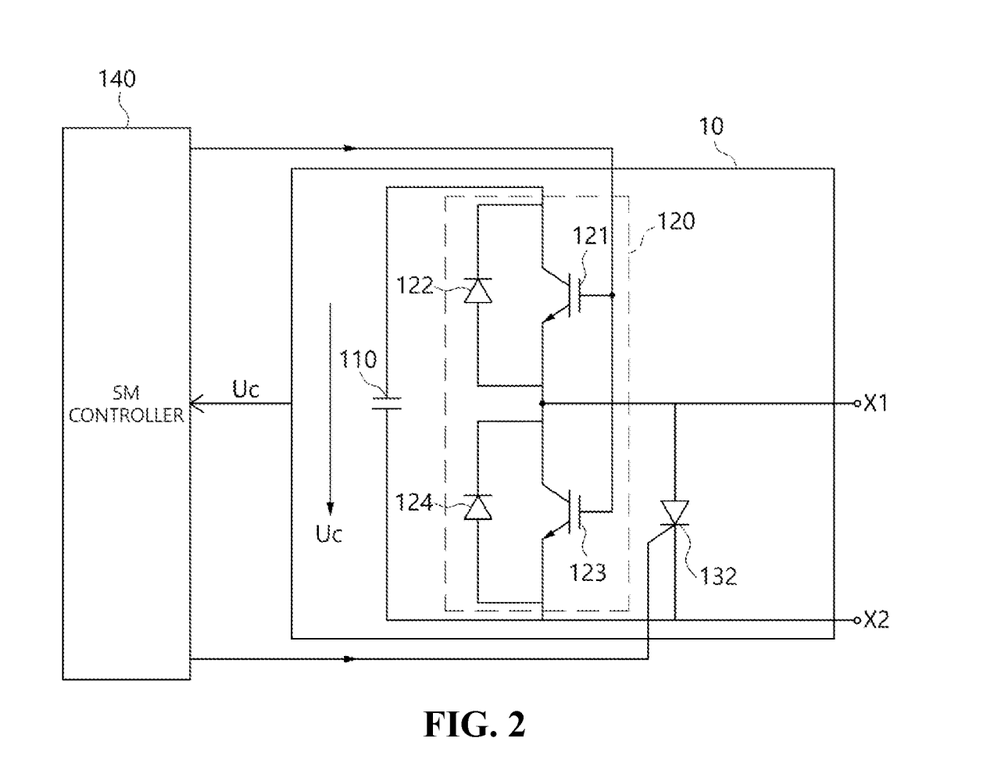
FIG. 2 is an equivalent circuit diagram a sub-module of a power converter according to a first embodiment of the present disclosure.

FIG. 2 is an equivalent circuit diagram illustrating a sub-module of a power converter according to a first embodiment of the present disclosure.

With reference to FIG. 2, in the power converter according to the present disclosure, each of the sub-modules 10 is configured with an energy storage unit 110 and at least one power semiconductor circuit 120 that is connected, in parallel, to the energy storage unit 110. One or more power semiconductors 120 are connected in series to each other. Each of the power semiconductor circuits 120 is configured to include power semiconductor switches 121 and 123 that are controllable in such a manner as to be turned on and turned off, and free-wheel diodes 122 and 124 that are connected, in antiparallel, to the power semiconductor switches 121 and 123, respectively. In another implementation example, in each of the sub-modules 10, the energy storage unit 110 and at least one power semiconductor circuit 120 may be arranged in a different way than in FIG. 2. Thus, each of the sub-modules 10 may have various configurations.

In addition, the sub-module 10 according to the present disclosure, a switching element 132 is connected, in parallel, to one of one or more of the power semiconductor circuits 120. FIG. 2 illustrates that, as one implementation example, the switching element 132 is connected, in parallel, to a lower power semiconductor circuit of the two power semiconductor circuits 120. However, the switching element 132 may be connected, in parallel, to an upper power semiconductor circuit thereof.

According to the present embodiment, the switching element 132 is connected, in parallel, to the power semiconductor circuit connected between the two output terminals X1 and X2 of the sub-module 10. For example, in a case where the two output terminals X1 and X2 are connected to opposite ends, respectively, of the upper power semiconductor circuit, the two output terminals X1 and X2 may be connected, in parallel, to the upper power semiconductor circuit.

When a failure occurs in the sub-module 10, the switching element 132 is quickly short-circuited and thus connects the two output terminals X1 and X2 to each other. Accordingly, the switching element 132 serves to allow failure-causing electric current to bypass the sub-module 10.

In this case, the switching element 132 has to perform a bypassing operation in a short time. Otherwise, an excessive voltage may be applied to the sub-module 10, or excessive electric current may flow thereto. Thus, internal components (a capacitor and a power semiconductor) may explode, thereby causing a fire. Furthermore, an excessive voltage may be applied to an entire system or excessive electric current may flow thereto. Also, an excessive voltage higher than a rated voltage may be applied to each of the sub-modules 10, and excessive electric current higher than rated electric current may flow thereto. The excessive voltage and the excessive electric current may have an adverse effect on reliability. It is desirable that the bypass operation is performed within several msec after a failure occurs.

To this end, the switching element 132 of the sub-module 10 according to the present disclosure is connected, in parallel, to one of the power semiconductor circuits 120. When an induced-failure signal is input into a gate terminal of the switching element 132, the switching element 132 is short-circuited. Specifically, a cathode terminal of the switching element 132 is connected to an emitter terminal of the power semiconductor switch 123 of the power semiconductor circuit 120, and an emitter terminal thereof is connected to a cathode terminal of the power semiconductor switch 123. In addition, the gate terminal of the switching element 132 receives the induced-failure signal of a sub-module (SM) controller 140.

According to the first embodiment of the present disclosure, the switching element 132 allows the failure-causing electric current to quickly bypass the sub-module 10 in order to protect the phase module 1. When the sub-module (SM) controller 140 applies the induced-failure signal to the gate terminal of the switching element 132, the switching element 132 is forced to undergo the induced failure and thus is short-circuited. Due to this short circuit, there occurs a short circuit between the first and second output terminals X1 and X2, and thus the failure-causing electric current bypasses the sub-module 10 through the two output terminals X1 and X2.

Specifically, when the induced-failure signal is applied from the sub-module controller 140 to the gate terminal of the switching element 132 of the sub-module 10, the switching element 132 is permanently burned out. Subsequently, the sub-module 10 including the switching element 132 is not restored to its original state.

When a failure occurs in the sub-module 10, the induced-failure signal is applied to the gate terminal of the switching element 132, and thus the switching element 132 is burned out and is short-circuited, thereby quickly forming a bypass path.

A bypass operating process performed by a bypass switch 132 will be described in detail below.

When a failure occurs in a specific sub-module 10, the SM controller 140 detects the failure and applies the induced-failure signal to the gate terminal of the bypass switch 132. Accordingly, the bypass switch 132 is short-circuited, and thus the first and second output terminals X1 and X2 are connected to each other. Accordingly, electric current flows through the first and second output terminals X1 and X2 instead of flowing into the sub-module 10 and thus bypasses the sub-module 10.

The bypass switch 132 is configured as a semiconductor switch. When the semiconductor switch is forced to receive the induced-failure signal from the outside, the induced failure occurs inside the semiconductor switch, and a connected circuit is shorted.

The semiconductor switch performs switching at a higher speed than a mechanical switch in the related art. For this reason, electric current quickly bypasses the sub-module 10. According to the present embodiment, electric current may bypass the sub-module 10 within a time of 1 msec that is much shorter than a switching time of approximately 4 msec of the mechanical switch.

In this manner, the switching element 132 according to the present disclosure is configured in such a manner as to be immediately short-circuited with the induced-failure signal from the SMA controller 140. When a failure occurs in a specific sub-module 10, the switching element 132 of the specific sub-module 10 may be short-circuited with the induced-failure signal from the SM controller 140.

Accordingly, the switching element 132 is forced to be internally burned out due to the occurrence of the induced failure and thus is short-circuited. Accordingly, the switching element 132 may allow the failure-causing electric current to bypass the sub-module 10 and thus may substitute for the mechanical switch in the related art.

The switching element 132 according to the present disclosure is short-circuited with the induced-failure signal, that is, using electricity. Thus, the failure-causing electric current may be allowed to bypass the sub-module 10 within 1 ms. Therefore, the switching element 132 according to the present disclosure may allow the phase electric current to bypass the sub-module 10 in a time that is much shorter than a time of approximately 4 ms taken to bypass the sub-module 10 when the mechanical switching element in the related art is used.

Figure 3:
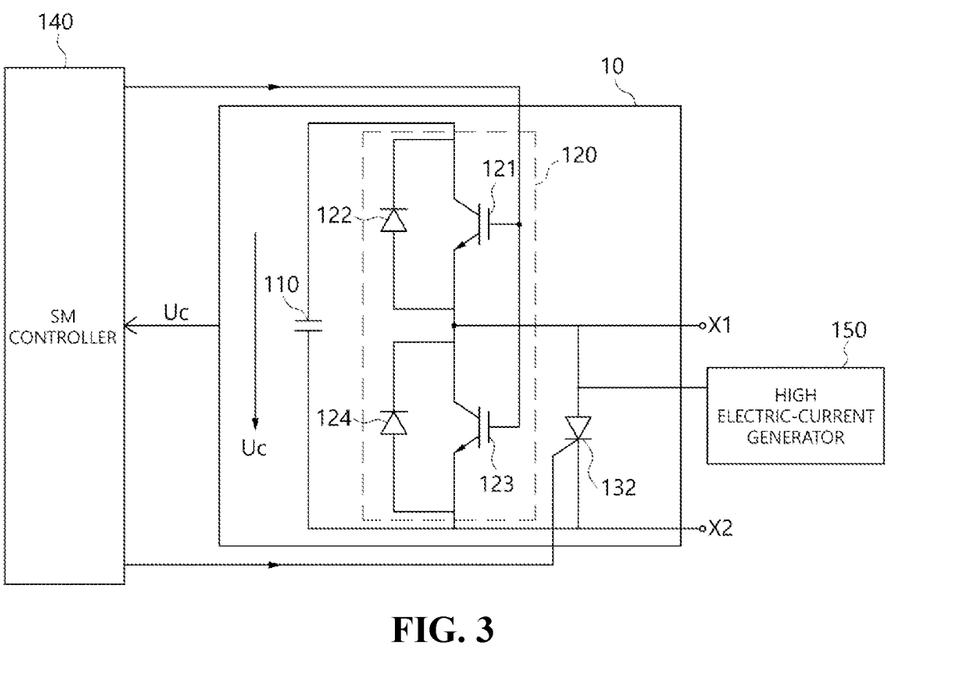
FIG. 3 is an equivalent circuit diagram a sub-module of a power converter according to a second embodiment of the present disclosure.

FIG. 3 is an equivalent circuit diagram illustrating a sub-module of a power converter according to a second embodiment of the present disclosure.

With reference to FIG. 3, a sub-module 10 according to the second embodiment of the present disclosure includes the switching element 132 connected, in parallel, to one of one or more of the power semiconductor circuits 120, and a high electric-current generator 150 that instantaneously applies high electric current to the switching element 132 when a failure occurs in the sub-module 10.

The cathode terminal of the switching element 132 is connected to the emitter terminal of the power semiconductor switch 123 of the power semiconductor circuit 120, and the emitter terminal thereof is connected to the cathode terminal of the power semiconductor switch 123.

The high electric-current generator 150 is configured in such a manner as to apply electric current higher than rated electric current for the switching element 132 to the switching element 132. The electric current higher than the rated electric current means electric current high enough so that the switching element 132 may be forced to undergo the induced failure. The high electric-current generator 150 may be configured in such a manner as to apply high electric current to the plurality of sub-modules 10.

When a failure occurs in the sub-module 10, the SM controller 140 applies a turn-on signal to the gate terminal of the switching element 132. Accordingly, the switching element 132 is turned on and thus allows electric current to pass through.

At the same time, the SM controller 140 transmits a high electric-current application signal to the high electric-current generator 150 when a failure occurs in the sub-module 10. According to the high electric-current application signal, the high electric-current generator 150 applies the high electric current to the switching element 132.

At this point, electric current flowing from the high electric-current generator 150 to the switching element 132 is much higher than the rated electric current for the switching element 132, and is high enough so that the switching element 132 may be forced to undergo the induced failure.

The high electric-current generator 150 applies the high electric current to the sub-module 10 in which a failure occurs among the plurality of sub-modules 10. That is, when a failure occurs, the switching element 132 is turned on. Then, when the high electric current higher than the rated electric current for the switching element 132 flows from the high electric-current generator 150 to the cathode terminal of the switching element 132, the switching element 132 is internally burned out. The switching element 132 is short-circuited due to this burning-out and thus allows electric current to pass through.

That is, when a high electric current signal higher than maximum rated electric current flows from the high electric-current generator 150 to the cathode terminal of the switching element 132 of the sub-module 10, the switching element 132 is permanently burned out. Subsequently, the sub-module 10 including the switching element 132 is not recovered to its original state because the switching element 132 is permanently burned out.

The switching element 132 according to the present disclosure is turned on, and thus the high electric current flows from the high electric-current generator 150 to the switching element 132. As a result, the switching element 132 is burned out and thus is short-circuited. Accordingly, when a failure occurs in a specific sub-module 10, the switching element 132 may be immediately short-circuited due to the high electric current flowing from the high electric-current generator 150. Accordingly, when a failure occurs, the switching element 132 may allow the failure-causing electric current to immediately bypass the sub-module 10.

In this manner, according to the present embodiment, in a state where the switching element 132 is turned on, when the high electric current flows form the high electric-current generator 150, the switching element 132 is internally short-circuited. Due to this short circuit, the switching element 132 is internally short-circuited, and thus the first and second output terminals X1 and X2 are connected to each other. Accordingly, the failure-causing electric current flows through the first and second output terminals X1 and X2 instead of flowing into the sub-module 10 and thus bypasses the sub-module 10.

Figure 4:
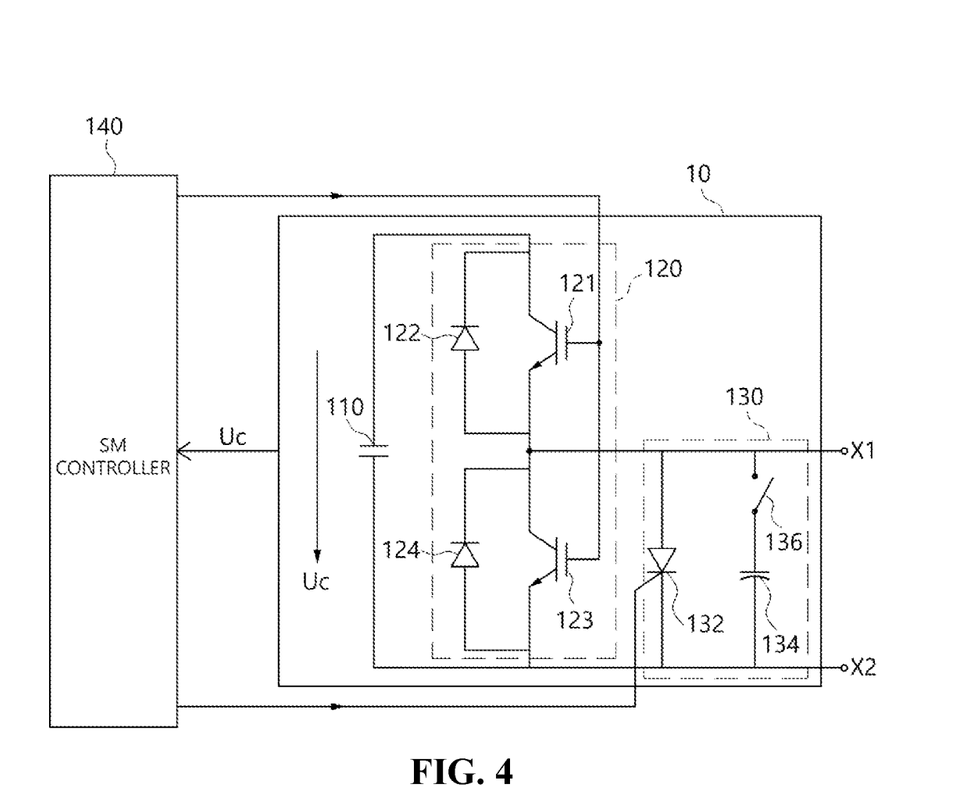
FIG. 4 is an equivalent circuit diagram illustrating a sub-module of a power converter according to a third embodiment of the present disclosure.

FIG. 4 is an equivalent circuit diagram illustrating a sub-module of a power converter according to a third embodiment of the present disclosure.

With reference to FIG. 4, according to the third embodiment, a bypass switching unit 130 connected, in parallel, to one of one or more of the power semiconductor circuits 120 is connected, in parallel, to the sub-module 10.

In FIG. 4, as one implementation example, the bypass switching unit 130 is connected, in parallel, to the lower power semiconductor circuit of the two power semiconductor circuits 120. However, the bypass switching unit 130 may be connected, in parallel, to the upper power semiconductor circuit thereof. At this point, it is desirable that the bypass switching unit 130 is connected, in parallel, to the power semiconductor circuit connected between the two output terminals X1 and X2 of the sub-module 10. For example, in the case where the two output terminals X1 and X2 are connected to opposite ends, respectively, of the upper power semiconductor circuit, the two output terminals X1 and X2 may be connected, in parallel, to the upper power semiconductor circuit. When a failure occurs in the sub-module 10, the bypass switching unit 130 serves to allow the failure-causing electric current to bypass the sub-module 10.

The bypass switching unit 130 includes the switching element 132, a capacitor 134, and a switch 136. The switching element 132 is connected to one of the power semiconductor circuits 120. The capacitor 134 is connected, in parallel, to the switching element 132. A voltage higher than a rated voltage for the switching element 132 is applied to the capacitor 134. The switch 136 is connected between the switching element 132 and the capacitor 134 and is turned on and off with a predetermined control signal. The switch 136 may be realized as one of a semiconductor switch, a diode, and a mechanical switch.

The cathode terminal of the switching element 132 is connected to the emitter terminal of the power semiconductor switch 123 of the power semiconductor circuit 120, and the emitter terminal thereof is connected to the cathode terminal of the power semiconductor switch 123. The capacitor 134 is connected, in parallel, to the switching element 132. A voltage higher than a maximum rated voltage for the switching element 132 is stored in the capacitor 134.

When a failure occurs in the sub-module 10, the SM controller 140 applies the turn-on signal to the gate terminal of the switching element 132. In addition, the SM controller 140 applies the turn-on signal to the switch 136, and thus the switch 136 connects the switching element 132 and the capacitor 134 to each other.

Accordingly, when a failure occurs, the switch 136 is turned on, and the switching element 132 is turned on. When the switching element 132 and the capacitor 134 are connected to each other, a voltage applied to the capacitor 134 is applied to the switching element 132.

As described above, the voltage higher than a maximum rated voltage for the switching element 132 is stored in the capacitor 134. For this reason, when the capacitor 134 is connected to the switching element 132, the voltage applied to the capacitor 134 is also applied to the switching element 132. Accordingly, the switching element 132 is burned out, and thus is short-circuited. The failure-causing electric current is allowed to pass through.

The switching element 132 is an element that, once burned out, is not restored to its original state. Therefore, the sub-module 10 in which the bypass path is formed one time is not restored to its original state.

In this manner, when a failure occurs, the switch 136 of the bypass switching unit 130 according to the present disclosure is turned on, and thus a voltage of the capacitor 134 is applied to the switching element 132. Due to the voltage applied to the capacitor 134, the switching element 132 is burned out and thus is short-circuited. Accordingly, the switching element 132 allows the failure-causing electric current to bypass the sub-module 10.

Figure 5:
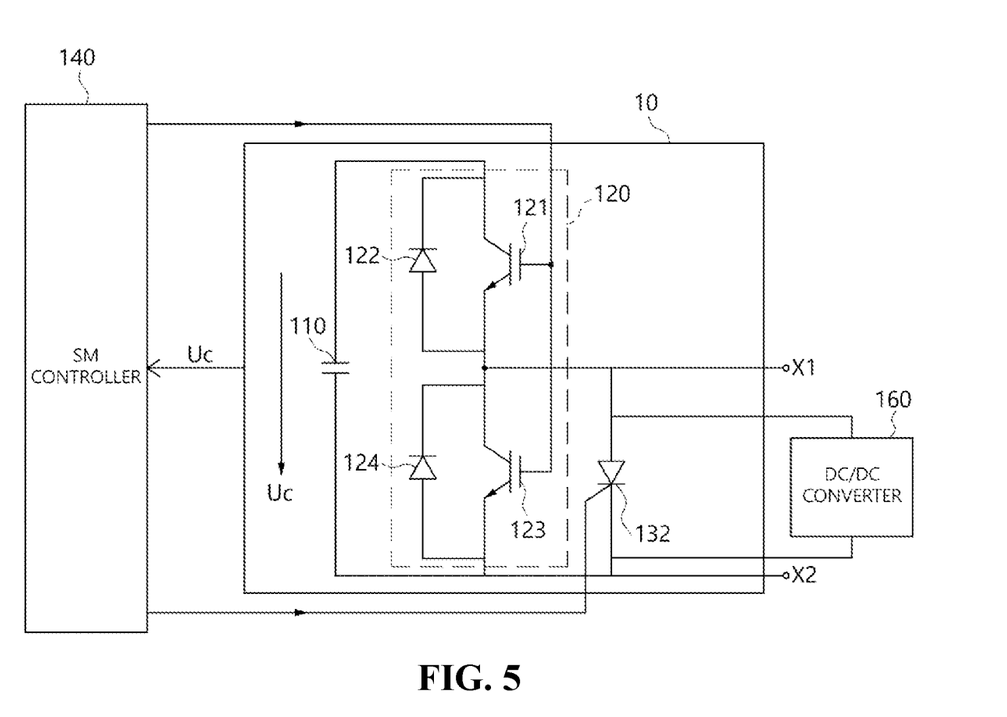
FIG. 5 is an equivalent circuit diagram a sub-module of a power converter according to a fourth embodiment of the present disclosure.

FIG. 5 is an equivalent circuit diagram illustrating a sub-module of a power converter according to a fourth embodiment of the present disclosure.

With reference to FIG. 5, according to the fourth embodiment, the sub-module 10 includes the switching element 132 and a DC-DC converter 160. The switching element 132 is connected, in parallel, to one of one or more of the power semiconductor circuits 120. The DC-DC converter 160 applies the voltage higher than the rated voltage for the switching element 132 to the switching element 132 when a failure occurs in the sub-module 10. The DC-DC converter 160 is connected, in parallel, to the switching element 132.

The cathode terminal of the switching element 132 is connected to the emitter terminal of the power semiconductor switch 123 of the power semiconductor circuit 120, and the emitter terminal thereof is connected to the cathode terminal of the power semiconductor switch 123. The DC-DC converter 160 is configured to apply the voltage higher than the maximum rated voltage for the switching element 132 to the switching element 132. The DC-DC converter 160 may be configured to apply a high voltage to the plurality of sub-modules 10.

That is, the DC-DC converter 160 may apply the voltage higher than the maximum rated voltage for the switching element 132 to the sub-module 10 in which a failure occurs among the plurality of sub-modules 10. The switching element 132 is burned out when a voltage higher than a rated voltage is applied from the DC-DC converter 160 thereto. The switching element 132 is short-circuited and thus allows electric current to pass through.

A process of forming the bypass path is described as follows. When a failure occurs, the turn-on signal is input from the SM controller 140 into the gate terminal of the switching element 132. Accordingly, the switching element 132 is turned on and the voltage higher than the maximum rated voltage is applied from the DC-DC converter 160 to the switching element 132. Thus, the switching element 132 is burned out and thus is short-circuited.

Accordingly, when a failure occurs in a specific sub-module 10, the switching element 132 may be immediately short-circuited due to the voltage applied from the DC-DC converter 160. In this case, the switching element 132 is permanently short-circuited, and thus the sub-module 10 including the switching element 132 is not restored to its original state.

According to the present disclosure, the bypass path is quickly formed using the switching element 132 that, once short-circuited, is permanently burned out. For this reason, the failure-causing electric current is allowed to bypass the sub-module 10 within 1 ms.

In this manner, according to the fourth embodiment of the present disclosure, when a failure occurs, the turn-on signal is input from the SM controller 140 into the gate terminal of the switching element 132. Accordingly, the switching element 132 is turned on, and the voltage higher than the rated voltage is applied from the DC-DC converter 160 to the switching element 120. Then, the switching element 120 is burned out and thus is short-circuited. Accordingly, when a failure occurs in the sub-module 10, the switching element 132 may be immediately short-circuited due to a voltage applied from the DC-DC converter 160. Due to this short circuit, the switching element 132 is short-circuited, and thus the output terminals X1 and X2 are connected to each other. Accordingly, the failure-causing electric current is allowed to bypass the sub-module 10 through the output terminals X1 and X2.

The above-described switching element and bypass switching unit according to the present disclosure are internally short-circuited due to the induced failure, and thus are no longer restored to their normal states. The switching element or the bypass switching unit according to the present disclosure have a different feature than a semiconductor switch in the related art. That is, the switching element or the bypass switching unit according to the present disclosure is short-circuited due to the induced failure. Thus, after short-circuited, the switching element or the bypass switching unit is impossible to turn on and turn off and is kept short-circuited.

Although all constituent elements according to the embodiment of the present disclosure are described as being combined into one constituent element or as operating in combination, the present disclosure is not necessarily limited to the embodiments. That is, all the constituent elements may be selectively combined into one or more constituent elements for operation without departing from the nature and gist of the present disclosure. The terms "include", "constitute", "have", and the like that are used above mean that the named constituent elements are not essential. Therefore, unless otherwise stated specifically, these terms should be construed to mean that additional constituent elements may be included, not that additional constituent elements are precluded. Unless otherwise stated specifically, all terms including technical and scientific ones have the same meanings as commonly understood by a person of ordinary skill in the art to which the present disclosure pertains. A commonly used term, such as a term defined in dictionaries, should be construed as having the same contextual meaning as that in the related art, and unless otherwise stated specifically in the present specification, should not be construed as having an excessively implied meaning or a purely literal meaning.

The technical idea behind the present disclosure is described above only for illustrative purpose. It is apparent to a person of ordinary skill in the art to which the present disclosure pertains that various alterations and modifications are possible without departing from the nature and gist of the present disclosure. Therefore, the embodiments of the present disclosure are for describing the technical idea of the present disclosure, rather than limiting it, and do not impose any limitation on the scope of the technical idea of the present disclosure. Accordingly, the scope of protection of the present disclosure should be defined by the following claims. All technical ideas that fall within the scope equivalent thereto should be interpreted to be included within the claims of the present disclosure.

The invention claimed is:

1. A sub-module of a power converter, the sub-module comprising:
   an energy storage unit;
   at least one power semiconductor circuit connected, in parallel, to the energy storage unit and configured with a plurality of power semiconductor switches and a plurality of freewheeling diodes;
   a switching element arranged between two output terminals (X1 and X2) connected to one of one or more of the power semiconductor circuits; and
   a device applying electric current or voltage to the switching element when a failure occurs,
   wherein the switching element is turned on when the failure occurs, and is forced to undergo an induced failure and thus is internally short-circuited when the electric current or voltage is applied from the device thereto, thereby connecting the output terminals (X1 and X2) to each other, and
   wherein the device comprises a high electric-current generator applying the electric current to the switching element, and the high electric-current generator applies electric current higher than rated electric current for the switching element to the switching element so the switching element is burned out, and when the electric current higher than the rated electric current is applied, the switching element is forced to undergo the induced failure.

2. The sub-module of claim 1, wherein when the failure occurs in the sub-module, failure-causing electric current bypasses the sub-module through the output terminals (X1 and X2) and the switching element.

3. The sub-module of claim 1, wherein the switching element comprises a press pack IGBT (PPI) semiconductor element.

4. A sub-module of a power converter, the sub-module comprising:
   an energy storage unit;
   at least one power semiconductor circuit connected, in parallel, to the energy storage unit and configured with a plurality of power semiconductor switches and a plurality of freewheeling diodes;
   a switching element arranged between two output terminals (X1 and X2) connected to one of one or more of the power semiconductor circuits; and
   a device applying electric current or voltage to the switching element when a failure occurs,
   wherein the switching element is turned on when the failure occurs, and is forced to undergo an induced failure and thus is internally short-circuited when the electric current or voltage is applied from the device thereto, thereby connecting the output terminals (X1 and X2) to each other, and
   wherein the device comprises a DC-DC converter applying the voltage to the switching element, and the DC-DC converter applies voltage higher than rated voltage for the switching element to the switching element so the switching element is burned out, and when the voltage higher than the rated voltage is applied, the switching element is forced to undergo the induced failure.

5. The sub-module of claim 4, wherein when the failure occurs in the sub-module, failure-causing electric current bypasses the sub-module through the output terminals (X1 and X2) and the switching element.

6. The sub-module of claim 4, wherein the switching element comprises a press pack IGBT (PPI) semiconductor element.

7. A sub-module of a power converter, the sub-module comprising:
   an energy storage unit;

at least one power semiconductor circuit connected, in parallel, to the energy storage unit and configured with a plurality of power semiconductor switches and a plurality of freewheeling diodes; and a bypass switching unit arranged between two output terminals (X1 and X2) connected to one of one or more of the power semiconductors circuits, wherein the bypass switching unit comprises:

a switching element connected to one of the power semiconductor circuits;

a capacitor connected, in parallel, to the switching element, a voltage higher than a rated voltage for the switching element being applied to the capacitor; and a switch connected between the switching element and the capacitor and turned on and turned off with a predetermined control signal, and wherein the switching element and the switch are turned on when a failure occurs, and when the switch is turned on, due to a voltage applied to the capacitor, the switching element is forced to undergo an induced failure and thus is internally short-circuited, thereby connecting the output terminals (X1 and X2) to each other.

8. The sub-module of claim 7, wherein the switching element comprises a press pack IGBT (PPI) semiconductor element.

9. The sub-module of claim 7, wherein when the failure occurs in the sub-module, failure-causing electric current bypasses the sub-module through the output terminals (X1 and X2) and the switching element.

* * * * *